United States Patent
Taple et al.

(10) Patent No.: US 12,347,441 B2
(45) Date of Patent: Jul. 1, 2025

(54) METHOD FOR RECORDING, PARSING, AND TRANSCRIBING DEPOSITION PROCEEDINGS

(71) Applicant: Cloud Court, Inc., Minneapolis, MN (US)

(72) Inventors: Norman Ira Taple, Minneapolis, MN (US); Michael David Okerlund, Minneapolis, MN (US)

(73) Assignee: Cloud Court, Inc., Minneapolis, MN (US)

( * ) Notice: Subject to any disclaimer, the term of this patent is extended or adjusted under 35 U.S.C. 154(b) by 0 days.

(21) Appl. No.: 17/982,862

(22) Filed: Nov. 8, 2022

(65) Prior Publication Data

US 2023/0059405 A1     Feb. 23, 2023

Related U.S. Application Data

(63) Continuation of application No. 16/434,781, filed on Jun. 7, 2019, now abandoned, which is a continuation of application No. 15/963,683, filed on Apr. 26, 2018, now Pat. No. 10,360,915.

(60) Provisional application No. 62/491,705, filed on Apr. 28, 2017.

(51) Int. Cl.
| | |
|---|---|
| *G10L 17/24* | (2013.01) |
| *G06Q 10/10* | (2023.01) |
| *G06Q 50/18* | (2012.01) |
| *G10L 15/22* | (2006.01) |
| *G10L 15/26* | (2006.01) |
| *G10L 17/00* | (2013.01) |

(52) U.S. Cl.
CPC .............. *G10L 17/24* (2013.01); *G06Q 10/10* (2013.01); *G06Q 50/18* (2013.01); *G10L 15/22* (2013.01); *G10L 15/26* (2013.01); *G10L 17/00* (2013.01)

(58) Field of Classification Search
CPC ................................. G10L 17/00; G10L 15/26
See application file for complete search history.

(56) References Cited

U.S. PATENT DOCUMENTS

| | | | | |
|---|---|---|---|---|
| 5,864,805 | A * | 1/1999 | Chen ....................... | G10L 15/22 704/E15.04 |
| 5,884,258 | A * | 3/1999 | Rozak ...................... | G06F 3/16 704/E15.04 |
| 6,332,122 | B1 * | 12/2001 | Ortega .................... | G10L 15/26 704/270 |
| 6,477,491 | B1 * | 11/2002 | Chandler ................ | G10L 15/26 704/235 |

(Continued)

FOREIGN PATENT DOCUMENTS

WO     WO2005062197 A1     7/2005

*Primary Examiner* — Samuel G Neway
(74) *Attorney, Agent, or Firm* — Billion & Armitage

(57) ABSTRACT

Techniques for accurately recording sworn deposition testimony without use of a court reporter are described herein. According to these techniques, participants in a deposition or other legal proceeding are identified in such a manner that speech in one or more audio files representing the deposition can be associated with the respective participants. The association of participants with recorded speech is used to automatically generate an accurate transcript sequentially reflecting what was said at the deposition proceeding and by which of the respective participants.

11 Claims, 10 Drawing Sheets

(56) References Cited

U.S. PATENT DOCUMENTS

| | | | |
|---|---|---|---|
| 6,754,631 B1* | 6/2004 | Din | G10L 15/26 704/E15.045 |
| 9,443,518 B1* | 9/2016 | Gauci | G06F 40/169 |
| 10,360,915 B2* | 7/2019 | Taple | G10L 17/00 |
| 2002/0002465 A1* | 1/2002 | Maes | G10L 15/065 704/E17.011 |
| 2002/0123883 A1* | 9/2002 | Jackson | H04M 3/5307 348/E7.078 |
| 2002/0138265 A1* | 9/2002 | Stevens | G10L 15/22 704/E15.04 |
| 2005/0137867 A1* | 6/2005 | Miller | G10L 15/26 704/E15.045 |
| 2005/0143994 A1* | 6/2005 | Mori | G10L 15/26 704/235 |
| 2007/0239689 A1* | 10/2007 | Bennett | G06Q 20/382 |
| 2009/0099845 A1* | 4/2009 | George | G10L 15/26 704/235 |
| 2009/0150151 A1* | 6/2009 | Sakuraba | G10L 21/04 704/E17.001 |
| 2010/0057459 A1* | 3/2010 | Barash | G10L 15/26 704/235 |
| 2010/0063815 A1* | 3/2010 | Cloran | G06Q 10/103 704/235 |
| 2010/0260482 A1* | 10/2010 | Zoor | G11B 27/10 386/239 |
| 2012/0014392 A1 | 6/2012 | Thorsen | |
| 2012/0143605 A1* | 6/2012 | Thorsen | G10L 15/183 704/235 |
| 2012/0290299 A1* | 11/2012 | Basson | G10L 15/26 704/235 |
| 2012/0303371 A1* | 11/2012 | Labsky | G10L 15/14 704/E13.011 |
| 2013/0238330 A1* | 9/2013 | Casella dos Santos | G16H 10/60 704/235 |
| 2013/0246941 A1* | 9/2013 | Madhava | G06Q 10/10 715/753 |
| 2013/0289988 A1* | 10/2013 | Fry | G10L 15/19 704/239 |
| 2013/0289996 A1* | 10/2013 | Fry | G10L 15/32 704/E15.018 |
| 2014/0067392 A1* | 3/2014 | Burke | G10L 15/22 704/E15.001 |
| 2018/0144747 A1* | 5/2018 | Skarbovsky | G06F 40/109 |
| 2018/0315429 A1* | 11/2018 | Taple | G10L 17/24 |
| 2019/0287535 A1* | 9/2019 | Taple | G06Q 50/18 |
| 2023/0059405 A1* | 2/2023 | Taple | G10L 17/00 |

* cited by examiner

METHOD FOR RECORDING, PARSING, AND TRANSCRIBING DEPOSITION PROCEEDINGS

CROSS-REFERENCE TO RELATED APPLICATION

This application is a continuation of U.S. application Ser. No. 16/434,781, titled "METHOD FOR RECORDING, PARSING, AND TRANSCRIBING DEPOSITION PROCEEDINGS", filed Jun. 7, 2019, which is a continuation of U.S. application Ser. No. 15/963,683, titled "SYSTEM AND METHOD FOR AUTOMATED LEGAL PROCEEDING ASSISTANT", filed on Apr. 26, 2018, now U.S. Pat. No. 10,360,915, which claims the benefit of U.S. Provisional Application No. 62/491,705, titled "SYSTEM AND DETECTING AND PARSING CONTEMPORANEOUS SPEECH EVENTS FROM A PLURALITY OF AUDIO INPUTS", filed on Apr. 28, 2017 in the United States of America, both of which are incorporated herein by reference. A claim of priority is made.

FIELD OF THE INVENTION

This disclosure is directed to audio recording and processing techniques, and more specifically to techniques for converting speech to text.

BACKGROUND

In a typical legal proceeding such as a trial or deposition, a court reporter is employed who administers oaths, listens to individual speakers who are a party to the legal proceeding (both attorneys and witnesses) and captures stenographically what is said and by whom. Using a court reporter to capture spoken language in a legal proceeding may suffer from drawbacks. For example, a court reporter may be expensive to employ and sometimes inaccurate. In addition, a court reporter may not efficiently complete transcripts of a legal proceeding, leading to delays.

SUMMARY

This disclosure is directed to systems, methods, and techniques providing to an automated legal proceeding assistant. In one example, a method is described herein. The method includes recording, using each microphone of a plurality of microphones, the content of a deposition. The content of the deposition comprises a plurality of speech segments recorded by the plurality of microphones, wherein each of the plurality of microphones is associated with a deposition participant of a plurality of deposition participants. The method further includes identifying, based on which microphone of the plurality of microphones each speech segment was recorded by, which deposition participant of the plurality of deposition participants is associated with each speech segment. The method further includes generating, based on which deposition participant of the plurality of deposition participants is identified as associated with each speech segment, a document comprising a transcript of the deposition. The transcript comprises a sequential identification of what content was spoken in each speech segment in written text, and which deposition participant of the plurality of deposition participants spoke the content in each speech segment.

As another example a system is described herein. The system includes at least one microphone. The system further includes a user interface device accessible to at least one of a plurality of deposition participants. The system further includes an audio translation engine. The audio translation engine includes an audio storage module configured to store at least one representation of audio recorded by the at least one microphone during a deposition proceeding. The audio translation engine further includes a speaker identification module configured to identify, in the audio recording, which of the plurality of deposition participants spoke one or more portions of the recorded audio. The audio translation engine further includes a speech-to-text module configured to convert speech of in the recorded audio into a textual representation of the speech. The audio translation engine further includes a transcript generator module configured to generate a document representing a transcript of the deposition based on the converted speech and the identified which of the plurality of deposition participants spoke the one or more portions.

According to another example, a system is described herein. The system includes at least one microphone. The system further includes a user interface device accessible to at least one of a plurality of deposition participants. The system further includes an audio translation engine. The audio translation engine includes audio storage means that store at least one representation of audio recorded by the at least one microphone during a deposition proceeding. The audio translation engine further includes a speaker identification means that identify, in the audio recording, which of the plurality of deposition participants spoke one or more portions of the recorded audio. The audio translation engine further includes speech to text means that convert speech of in the recorded audio into a textual representation of the speech. The audio translation engine further includes transcript generation means that generate a document representing a transcript of the deposition based on the converted speech and the identified which of the plurality of deposition participants spoke the one or more portions.

DETAILED DESCRIPTION

Figure 1:
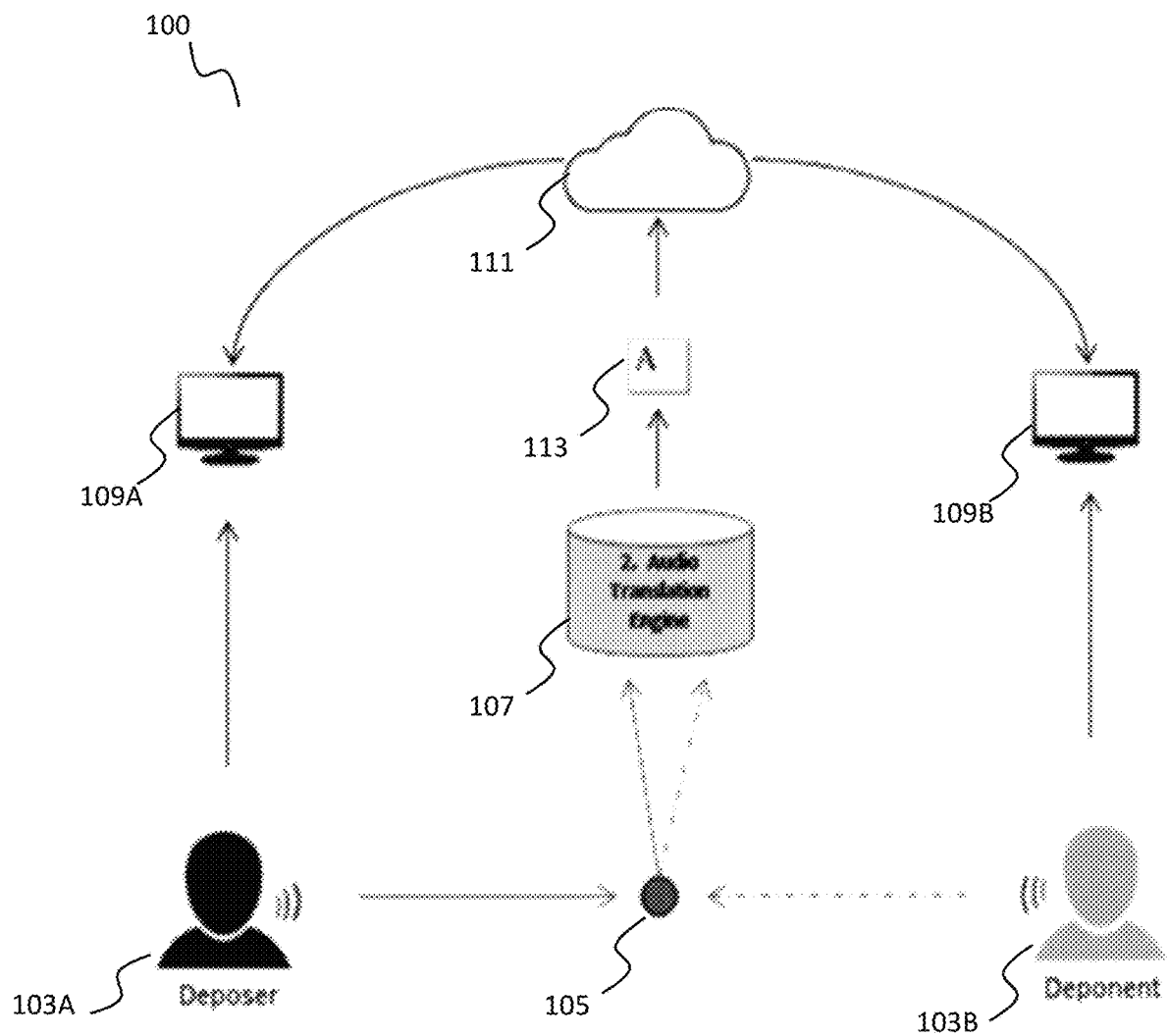
FIG. 1 is a conceptual diagram depicting one example of an automated legal proceeding assistant consistent with one or more aspects of this disclosure.

FIG. 1 is a conceptual diagram illustrating one example of an Automated Legal Proceeding Assistant (ALPA) system 100 according to one or more aspects of this disclosure. ALPA system 100 is an automated system that provides assistance that simplifies a legal proceeding, such as a trial or deposition, for participants in the legal proceeding. For example, ALPA 100 may enable the participants, for example deponents, attorneys, judges, and the like, to swear-in, automatically record testimony, generate transcripts, and provide a smooth and seamless process to enable resolution of ambiguities in generated transcripts to create a final, official transcript of the legal proceeding sufficient to serve as evidence, if necessary. In some examples, ALPA system 100 may advantageously perform some functions typically performed by a human court reporter.

System 100 described herein improves efficiency by eliminating the time-lag on receiving deposition transcripts. In some examples, ALPA system 100 creates a revenue stream for attorneys/law firms/companies who perform depositions as they can now charge for the product (over and above any billable time) while eliminating paying a court reporter for her/his time performing transcription and for the deposition transcript itself, for any expedited transcript production, for the editing of a transcript for accuracy, and for the treatment of documents referenced during the deposition, such as exhibits. Using a court reporter will be more expensive for a client than using ALPA system 100. Thus, ALPA system 100 may provide attorneys or law firms a selling point for their clients (or can save money if they in-house their depositions).

The examples described are directed to a deposition legal proceeding, however one of skill in the art will recognize that the techniques described herein may be applicable to any type of legal proceeding that requires generation of reliable transcripts reflecting the content of what was said, and by whom, during the legal proceeding.

As shown in FIG. 1 ALPA system 100 includes an audio translation engine 107, at least one microphone 105, and at least one user interface 109A, 109B. ALPA system 100 utilizes one more of microphones 105 to detect, capture, transmit and record sounds, including voices. The microphones 105 can be any one of numerous such devices known in the art, such as standalone microphones (whether "wired" or wireless) or devices that incorporate microphones or other audio technology, such as computers (laptops, smart phones, iPads) and the like.

As shown in FIG. 1, microphone(s) 105 are arranged to capture recordable audio of participants in a deposition proceeding. As shown, microphone 105 is arranged to capture audio reflecting statements made orally by deposer 103A, as well as deponent 103B.

As also shown in FIG. 1, system 100 includes an audio translation engine 107. Audio translation engine 107 receives (directly or indirectly) from microphone 105 digital or other data reflecting audio recordings of oral statements and other audible sounds made by deposer 103A and deponent 103B in the course of a deposition proceeding. Audio translation engine 107 stores, for example in temporary memory such as Random Access Memory (RAM), or long term storage such as a magnetic hard disk or other long-term storage device (or, in other embodiments, otherwise accesses electronically) the received data reflecting audio recordings, and processes the data to generate a transcript 113 reflecting the orally communicated content of the deposition proceeding. Audio translation engine 107 generates the transcript 113 to include all (or substantially all) statements made by participants 103A, 103B on the record during the course of the deposition, with each statement identified based on who said the statement in a sequential or substantially sequential manner.

In addition, ALPA system 100 includes user interfaces 109A, 109B. User interfaces 109A-109B enable users, such as participants of the legal proceeding, and/or non-participants running the legal proceeding (administrator, paralegal, etc.), to interact with system 100 during a deposition. For example, user interfaces 109A, 109B may each comprise a computing device (laptop, smartphone, tablet computer) with a display and some form of input means (keyboard, mouse, touch-screen) for a user to receive information from system 100 and/or to provide input to system 100.

As shown in FIG. 1, audio translation engine 107 is coupled to a network 111, such as the internet. Network 111 enables communication between audio translation engine 107 and user interfaces 109, as well as to other components of system 100 not depicted in FIG. 1. For example, although not depicted in FIG. 1, system 100 may include one or more remote computing devices such as server computers accessible via network 111 that store data and or execute instructions associated with audio translation engine 107, user interfaces 109, or both.

Figure 2:
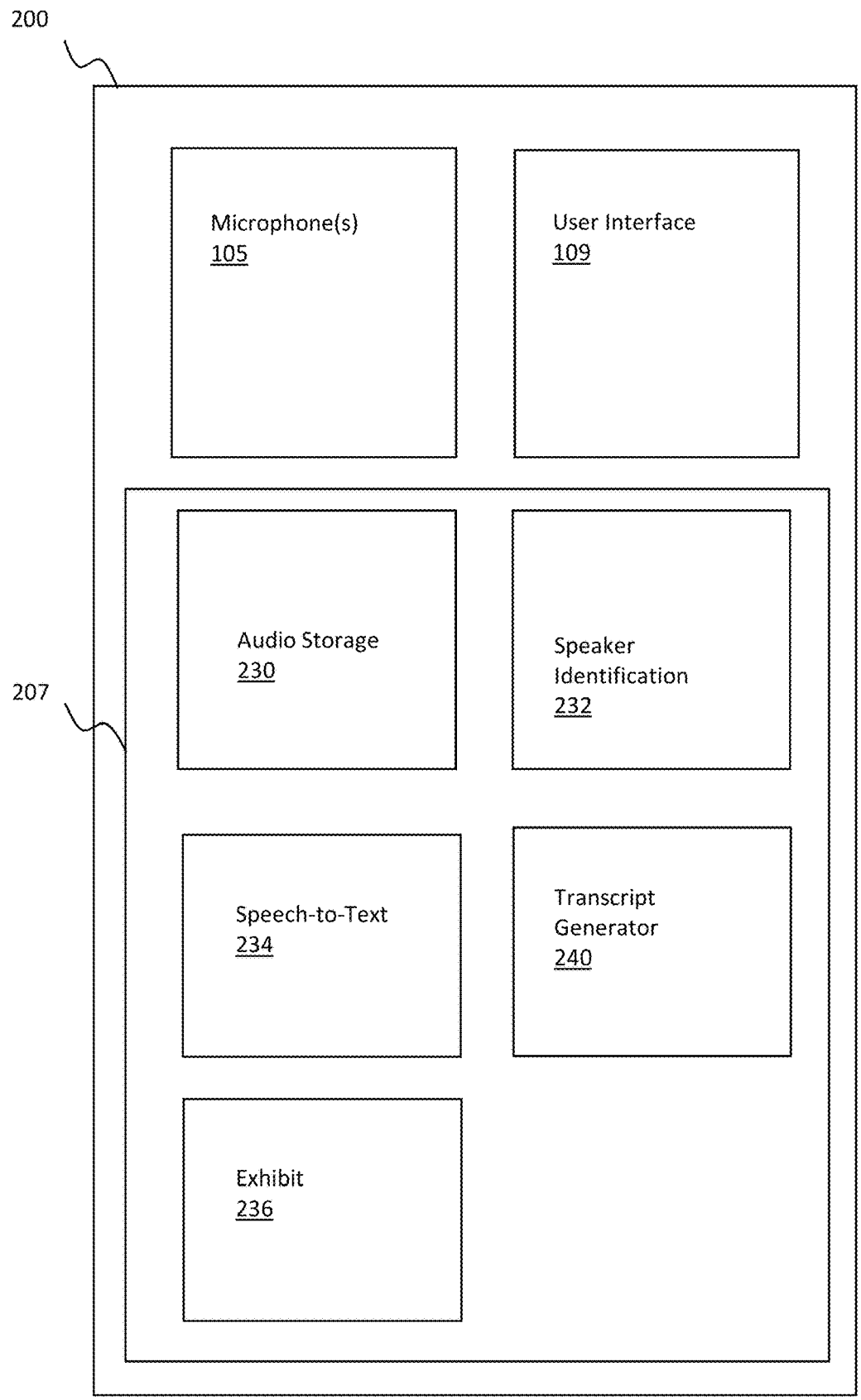
FIG. 2 is a block diagram depicting components of an automated legal proceeding assistant system consistent with one or more aspects of this disclosure.

FIG. 2 is a block diagram depicting one example of an Automated Legal Proceeding Assistant (ALPA) 200 according to one or more aspects of this disclosure. As shown in FIG. 2, ALPA 200 includes an audio translation engine 207, at least one microphone 105, and at least one user interface 109. Microphone 105 includes any device or devices configured to capture an audio recording. User interface 109 include any device that enable users, such as participants in a legal proceeding, to interact with ALPA system 200, for example to provide input or receive feedback from ALPA system 200.

As shown in FIG. 2, audio translation engine 207 includes an audio storage module 230, a speaker identification module 232, a speech to text module 234, and a transcript generator module 240. As described herein, each of modules 230, 232, 234, 240 include software instructions stored in a tangible storage medium and executable by a processor of a computing device. In some examples, each of modules 230, 232, 234, 240 are executable on a computing device local to where a legal proceeding such as a deposition takes place. For example, one or more of modules 230, 232, 234, 240 may execute on a device that serves as user interface 109, which may be a smartphone, tablet, laptop computer, desktop computer, or the like. In other examples, one or more of modules 230, 232, 234, 240 include software instructions executable on a processor of one or more computing devices located remotely, such as one or more server computing devices coupled to audio translation engine 207 over a network such as the internet.

In operation, ALPA system 200 allows a user to initiate the deposition proceeding. As an example, ALPA system 200 provides a user with a visual indication, such as through a display of user interface 109, with an option to commence the deposition proceeding. In advance of, or contemporaneously to the start of a deposition, the ALPA system 200 requests or permits the identification of deposition participants. Deposition participants may include one or more deponents, or one or more deposing attorneys, one or more representing attorneys who represent the deponent in the deposition, or one or more other participants, such as witnesses or, in the course of courtroom proceedings, judges or magistrates or other court personnel. ALPA system 200 may also request or permit the input of other information associated with the deposition, such as a court case number, filing date, other information that identifies the subject matter of the deposition proceeding. ALPA system 200 may also request or permit the input, though a user interface 109, any other information that is typically reflected or reflected in a deposition transcript, including information associated with the confidentiality level or presumed confidentiality level of the subject matter of the proceeding, information regarding individuals present but not speaking at the deposition, the location of the deposition, or the law firms and companies represented by individuals present, in person or telephonically, at the deposition (whether speaking or assigned a microphone or not).

In some examples, ALPA system 200 will execute an initialization procedure to prepare for recording and generating a transcript of the deposition proceeding. As part of the initialization procedure, ALPA system 200 determines a list of participants in such a manner that system 200 may differentiate between different speakers during the deposition proceeding, so that an accurate transcript can be generated. For this purpose, transcript generation engine 207 includes a speaker identification module 232, which identifies respective participants of the deposition.

In some examples, ALPA system 200 includes a plurality of microphones 105, each of which are assigned to a particular deposition participant. According to these examples, speaker identification module 232 uses the microphone assignments themselves to associate recorded audio with a particular speaker. For example, each participant may wear, or keep in close proximity, a microphone 105. As examples, the participants may wear a microphone (e.g., secured to a user's shirt collar, earpiece, etc.), or may use a computing device including a microphone, such as a smartphone or tablet, or a standalone microphone device arranged in proximity to the participant.

According to these examples, system 200 may prompt participants, via user interface(s) 109, to speak a word or phrase, such as their name. Speaker identification module 232 may then determine whether it can accurately identify the spoken voice of each participant speaker. In some examples, if speaker identification module 232 is unable to accurately separate one speaker from another, speaker identification module 232 may request, via user interface(s) 109, that one or more participants change their microphone configuration. For example, speaker identification module 232 may request that one or more participants move further away from other participants, or that one or more participants use a different microphone.

According to some other examples, ALPA system 200 may not only use assigned microphones 105 to identify different speaker participants from one another. According to these examples, ALPA system 200 may instead, or in addition to identifying speakers based on a microphone that recorded audio, process (e.g., using audio captured from one microphone only (capturing audio from multiple deposition participants), or in another embodiment several microphones 105) the captured audio to identify respective speakers in audio recordings. According to these examples, speaker identification module 232 identifies speaker participants based on a number factors alone or in combination, including voice pitch height, pitch modulation, pitch range, speech rate, fluency, vocabulary, grammar, usage and other speech patterns or other data. Additionally, speaker identification module 232 may identify a user by other vocal traits, including measurements of the speakers use of vowels, including (for example) average and standard deviation for fundamental frequency; period to period frequency; period to period amplitude variation; and GNE (glottal to noise excitation ratio), as examples.

According to these examples, speaker identification module 232 is configured to store one or more speaker profiles in memory or access existing profiles of known speakers from prior depositions (as an example). According to these examples, during an initialization procedure of ALPA 200, speaker identification module 232 requests, using user interface(s) 109, that each participant to the deposition identify themselves, for example through spoken word, or text input via user interface(s) 109, or via other means. Speaker identification module 232 then determines whether it has access to a stored profile for each deposition participant sufficient to identify them based on recorded speech. If speaker identification module 232 does not include a stored profile for a deposition participant, it may request that the missing participant supply information allowing speaker identification module 232 to create a profile. For example, speaker identification module 232 may, via user interface(s) 109, request that the missing participant speak several predefined words or phrases from which speaker identification module 232 can extract one or more speech parameters or properties to generate a profile for that user.

In some examples, speaker identification module 232 may be generally configured to utilize identification of a microphone or microphones that captured audio to identify which deposition participant is associated with recorded audio segments, but may utilize processing to identify speaker(s) based on stored user profiles as a fail-safe. For example, system 200 may include a plurality of microphones each assigned to a deposition participant, and one or more "fail-safe" microphones not assigned to a particular deposition participant but arranged to capture audio during a proceeding. According to such examples, if for some reason speaker identification module 232 is unable to identify a speaker associated with an audio segment, speaker identification module 232 may process audio recorded by the fail-safe microphone(s) to identify speakers associated with the recorded audio.

In some examples, whether speaker identification module 232 is configured to identify respective speaker participants of the deposition proceeding based on microphone 105 assignments, or based on processing captured audio to determine an identity of respective speaker participants based on comparison to a predefined profile, or both, as part of the initialization procedure speaker identification module 232 determines whether each deposition participant is a valid deposition participant whose speech may be identified in audio recordings. In some embodiments, the speaker identification module may identify, during the course of a deposition, the speech of someone not pre-identified as being a participant in the deposition, but may nevertheless, and in conjunction with system 200, record and translate their speech events.

In some embodiments, information solicited by the initialization procedure of ALPA 200 will be input prior to the deposition though user interface 109, and as a result, the deposition participants will not need to enter information or establish a user profile for use by speaker identification module 232 as part of the deposition proceeding itself. For example, in advance of the deposition, a legal assistant or other user may pre-enter information, including the names of the participants, the firms or companies they represent, link the participants with them any pre-existing voice profiles if one or more deposition participants have previously used system 200, input the location of the deposition, the case name and caption, the deponent name, etc. In some cases, such information will be entered well in advance of the deposition proceeding itself. In this manner, deposition participants, and other users, may proceed immediately with the deposition proceeding itself, which may beneficially save time.

In some examples, as part of the initialization procedure, system 200 requests required participants of the meeting to administer an oath. Accordingly, system 200 outputs audio instructions or presents on a display (of user interface 109) a textual description of the oath, and request signatures or the traditional vocal assent to proceed under oath from the required participants. In some examples, signatures may be received via the user(s) writing their signatures on a touch-screen display of user interface 109.

Once speaker identification module 232 has completed the initialization procedure so that it is prepared to identify the source of spoken word for each identified participant in an audio recording, the deposition proceeding may commence. Accordingly, ALPA 200 may, via user interface(s) 109, request confirmation from one or more participants that the deposition should commence.

Once ALPA 200 receives an indication that the deposition should commence, the parties may commence the deposition, for example, the deposing attorney may ask questions to the deponent, the deponent may answer, and the deponent's attorney may interject with objections or the like.

As the deposition proceeds, audio storage module 230 receives an output signal from microphone(s) 105, and stores one or more audio recordings representing what was said at the deposition in memory. For example, audio storage module 230 may compress received audio recordings to reduce size, encrypt received audio recordings to ensure security, or otherwise process audio recordings. In some examples, audio storage module 230 stores a single audio recording that represents an entire deposition. In other examples, audio storage module 230 stores a plurality of audio files that represent captured audio from multiple microphones 105. In some examples, audio storage module stores audio recordings with a plurality of timestamps that identify when a particular recording was made.

In some examples, as audio storage module 230 operates to store recorded audio, speaker identification module 232 analyzes recorded audio (e.g., based on which microphone 105 recorded the audio, or based on matching with stored user profiles as described above), so that each audio recording is stored by audio storage module 230 with a corresponding identification of the source of the recording. In some examples, audio storage module 230 stores audio recordings on a memory storage device (e.g., Random-Access-Memory, hard disk storage, flash memory storage) on a computing device local to the deposition proceeding, such as user interface(s) 109. In other examples, audio storage module 230 stores audio recordings on a computer server located elsewhere and connected via a network such as the internet.

In some examples, audio storage module 230 is operable to establish confidentiality for stored audio recordings. According to these examples, audio storage module 230 may store recorded audio with one or more confidentiality markers that system 200 may use to ensure that only those parties (e.g., respective deposition participants) may access information, such as audio recording(s), that the deposition participant is authorized to access.

In some examples, system 200 may be configured to control access by assigning confidentiality markers to other data used by system 200, for example identification of deposition participants or other parties to a court proceeding, exhibits, user voice profiles, or any other data used by system 200. In this manner, system 200 may enable respective parties to easily access data or information they are allowed to access, however maintain confidentiality that would normally be maintained in a traditional court or deposition proceeding.

As also depicted in FIG. 2, ALPA 200 further includes a speech-to-text (STT) module 234. STT module 234 analyzes audio recordings stored by audio storage module 230 to convert the content of spoken word to written text that may be used to generate a transcript of the deposition proceeding. STT module 234 may include one or more executable software modules that are configured to analyze an audio recording to identify features in the recording that enable STT module 234 to output one or more text files that represent what was said in the audio recording(s).

Speaker identification module 232 further operates to identify in audio recordings stored by audio storage module 230, a speaker source for each word or phrase. As described above with respect to the initialization phase, in some examples speaker identification module 232 identifies speakers based on which of a plurality of microphones recorded particular audio (or recorded the audio the loudest). In other examples, speaker identification module 232 uses one or more stored profiles representing deposition participants in order identify a speaker in recorded audio. In other examples, speaker identification module 232 identifies speakers in recorded audio based on both an assigned microphone and one or more stored profiles.

As also shown in FIG. 2, ALPA 200 further includes an exhibit module 236. Exhibit module 236 is configured to manage exhibits as part of the deposition proceeding, such that the exhibits are easily accessible by participants in the deposition, and such that their use may be reflected in a generated transcript. For example, prior to or during a deposition proceeding, a participant or other user (e.g., legal assistant or paralegal), may submit to system 200 via user interface 109 one or more documents that are identified as exhibits associated with a deposition proceeding or case. During a deposition proceeding, exhibit module 236 may make one or more submitted exhibition documents available to the deposition participants, for example via a display of user interface(s) 109. Exhibition module 236 may capture data associated with use of the exhibit, for example exhibition module 236 may capture a timestamp associated with presentation of each exhibit document, and/or may associate the presentation of the exhibit with audio files, or portions of audio files, that were captured while the exhibit was being presented to the deposition participants. In this manner, data associated presentation of exhibit documents may be used to generate a transcript that reflects the discussion of the exhibit documents.

As also shown in FIG. 2, ALPA 200 further includes a transcript generation module 240. Transcript generation module 240 is operable to receive the output of STT module 234, as well as the output of speaker identification module 232 and exhibit module 236, to generate a transcript that accurately reflects the deposition proceeding including what was said during the deposition proceeding, who said it, and what exhibits were discussed during the deposition. For example, transcript generation module 240 receives text from speech to text module 232 reflecting what was said in one or more recordings stored by audio storage module 230, an indication of which deposition participant spoke the words associated with the received text from speaker identification module 232, and/or an identification of one or more exhibit documents that were presented and discussed during the deposition, and when they were presented and discussed. Transcript generator 240 may review timestamps or other information contained in stored audio, and piece together a transcript reflecting sequentially the content of what was said, and by whom, during the deposition proceeding. Transcript generator 240 may also use additional information in generating a transcript, for example, when the parties went on and off the record (e.g., reflecting breaks in a deposition proceeding such as a lunch break or overnight break when a deposition proceeding spans multiple days), the text of an oath administered to deposition participants, information that is reflected in a cover page of the transcript, such as identification of a court case number, participant names, law firms involved, an administrator's name, etc.

In some examples, transcript generator 240 may generate portions of a transcript in real-time during a deposition proceeding. According to these examples, as audio storage module 230 receive and stores audio data from microphone(s) 105, STT module 234 converts the stored audio data into a text representation, and speaker identification module 232 associates a deposition participant to each converted text representation. At the same time transcript generator 240 sequentially generates transcript portions as the deposition proceeding takes place. In some examples, by sequentially generating transcript portions in real time, transcript generator 240 can quickly generate a transcript of the deposition that is available to the deposition participants immediately upon conclusion of the deposition proceeding. In some examples, the initial transcript generated upon conclusion of the deposition may be a "rough" version of the transcript that includes some errors. System 200 may be configured to enable deposition participants to resolve such errors, as described in further detail below.

In some examples, transcript generator 240 is operable to, while a deposition proceeding is taking place, output via user interface(s) 109, generated transcript portions for real-time review by participants. According to these examples, transcript generator 240 may receive from a user confirmation and/or updates to generated transcript portions during the course of the deposition. In some such examples, providing for real-time review of transcript portions during the course of a deposition may enable transcript generator 240 to generate a final transcript accepted by all deposition participants faster than if review of a generated transcript and resolution of ambiguities in a generated transcript take place after a deposition proceeding has concluded.

In some examples, system 200 may be configured to notify deposition participants when the deposition proceeding is "in-session" and testimony is being recorded. For example, system may use user interface(s) 109 to notify deposition participants when a deposition has commenced, when paused, and when complete via a display screen of the user interface(s). In other examples, system 200 may include a light such as a light emitting diode (LED) device coupleable to system 200 via user interface(s) 109. As one specific example, such a light device may comprise a red light and a green light. System 200 may operate the green light when the deposition is in progress and audio is recorded by microphone(s) 105, and operate the red light when the deposition is paused, has completed, or is otherwise not in-session.

Upon completion of the deposition (e.g., as indicated by a deposition participant), transcript generation module 240 generates a document that includes a transcript that generally reflects what was stated during the deposition by the deposition participants. Once the transcript has been generated, it may be sent to each participant to the deposition, such as the deponent and respective attorneys, via user interface(s) 109 (e.g., a smartphone or tablet) for review for accuracy and ultimately final approval.

In some examples, ALPA system 200 is configured to resolve any ambiguities in the generated deposition transcript. For example, ALPA system 200 may identify any portions of the deposition transcript for which STT module 234 was unable to accurately determine the content of what was spoken, or for which speaker identification module 232 was unable to accurately identify a speaker. According to these examples, ALPA system 200 may send one or more deposition participants a deposition transcript proactively identifying each ambiguity, and request confirmation that the ambiguity-labeled content is accurate, or that the respective participant(s) supply a correction. In some examples, system 200 may send the deposition transcript with a time limit in which the participant(s) are required to respond. For example, system 200 may request (via email, via 109, or other) that the participant type or speak what that participant believes was actually said during the deposition, after which those corrections themselves may be reviewed by one or more individuals for accuracy themselves, and potentially contested, if there is a disagreement among the parties. In some examples, system 200 may be configured to analyze an identified ambiguity and provide one or more suggestions to resolve the ambiguity, which may be selected by the participants.

In some examples, audio storage module 230 maintains data reflecting at least a portion of audio captured during a deposition proceeding in a manner that the recorded audio is associated with generated deposition text. In this manner, the respective deposition participants can use such an audio recording to reconcile any ambiguities in a transcript or transcript portion generated by transcript generator 240.

In some examples, if all deposition participants provide the same answer in response to identified ambiguitie(s) (or no ambiguities were detected), transcript generator 240 generates a final transcript that reflects the corrected ambiguity and sends the final transcript to all participants, notifies the participants that it is finalized, or makes it available via 109. In other examples, where the deposition participants do not agree on an identified ambiguity, transcript generator module 240 generates a transcript that identifies the ambiguity as "in-dispute," and sends the generated transcript to all participants or otherwise makes it available, as stated above.

ALPA system 200 described above provides numerous advantages in comparison to prior techniques for recording deposition transcripts that require a trained and licensed court reporter. For example, using ALPA system 200 may enable parties to a deposition or other legal proceeding to generate a transcript with less cost, because it is not necessary to hire an expensive court reporter to perform the task of generating a transcript. In addition, ALPA system 200 may work faster, and more efficiently, than a human court reporter. For example, ALPA system 200 may identify speakers and convert speech to text in real-time, thereby allowing a transcript to be generated immediately after the legal proceeding commences, in comparison to a court reporter who may take days or weeks to review manually typed text and generate a final transcript. In addition, ALPA system 200 may provide for better accuracy than a human court reporter, and enables fast and reliable correction (or at least identification) of ambiguities in generated transcript subject matter in a reliable manner which avoids disputes between deposition participants.

Figure 3A:
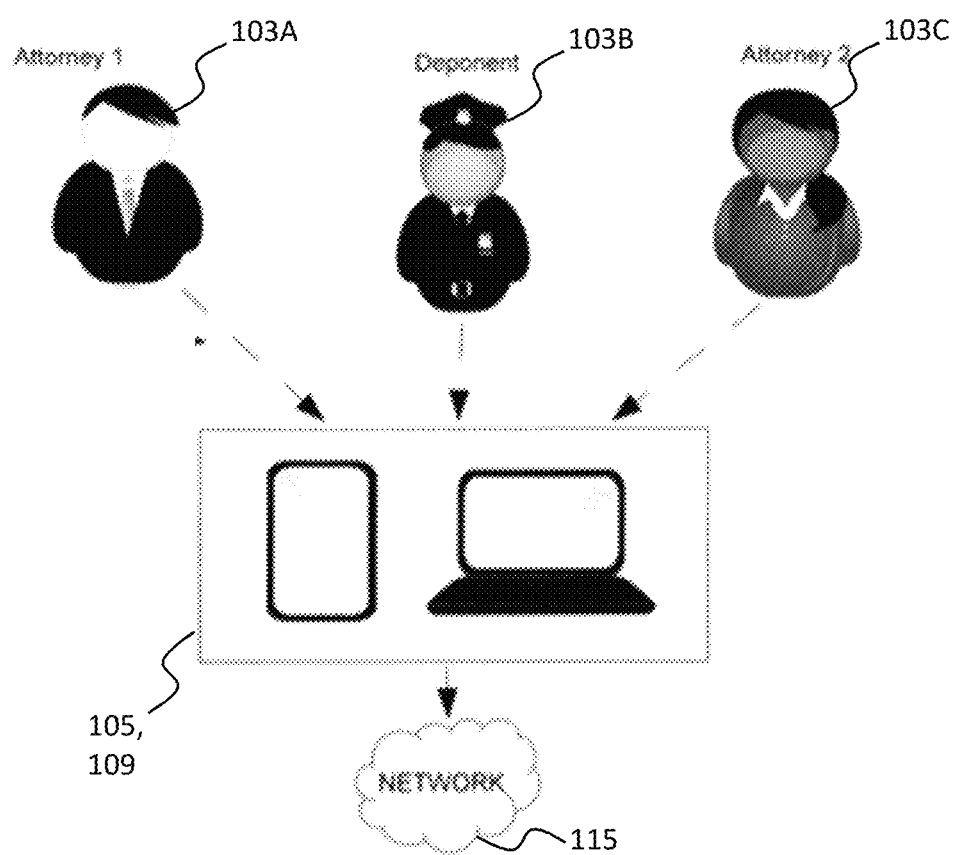
FIGS. 3A-3C are conceptual diagrams depicting the recording of speech from deposition participants to generate a transcript consistent with one or more aspects of this disclosure.
Figure 3B:
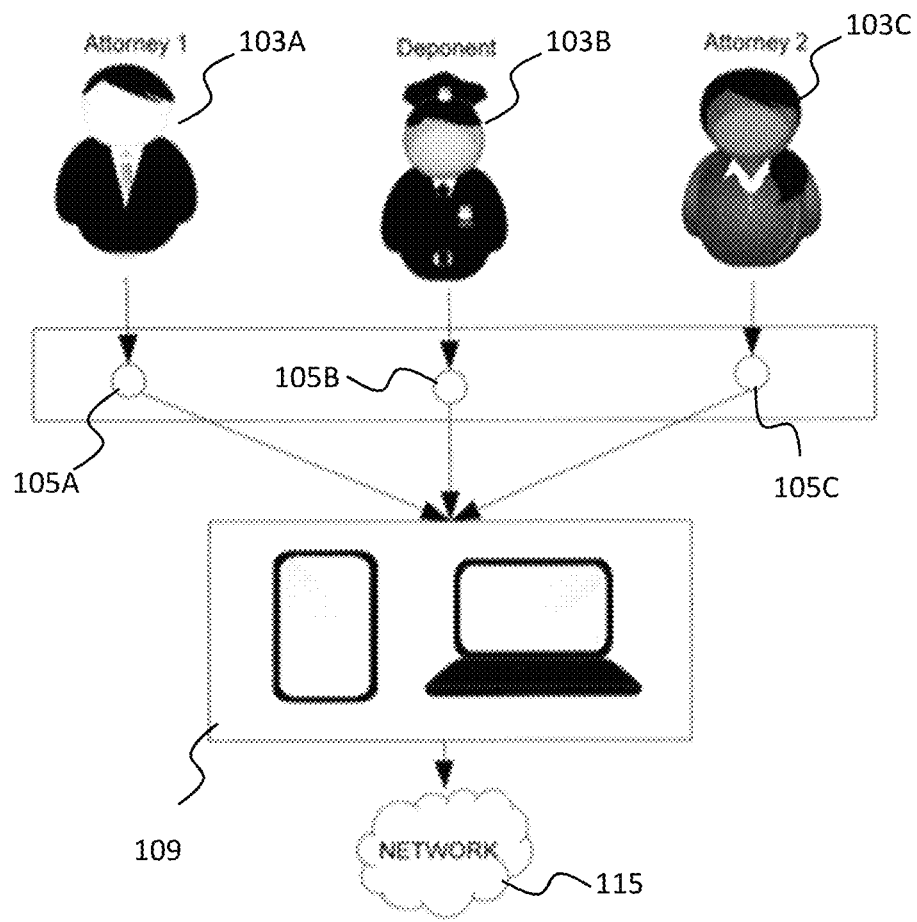
Figure 3C:
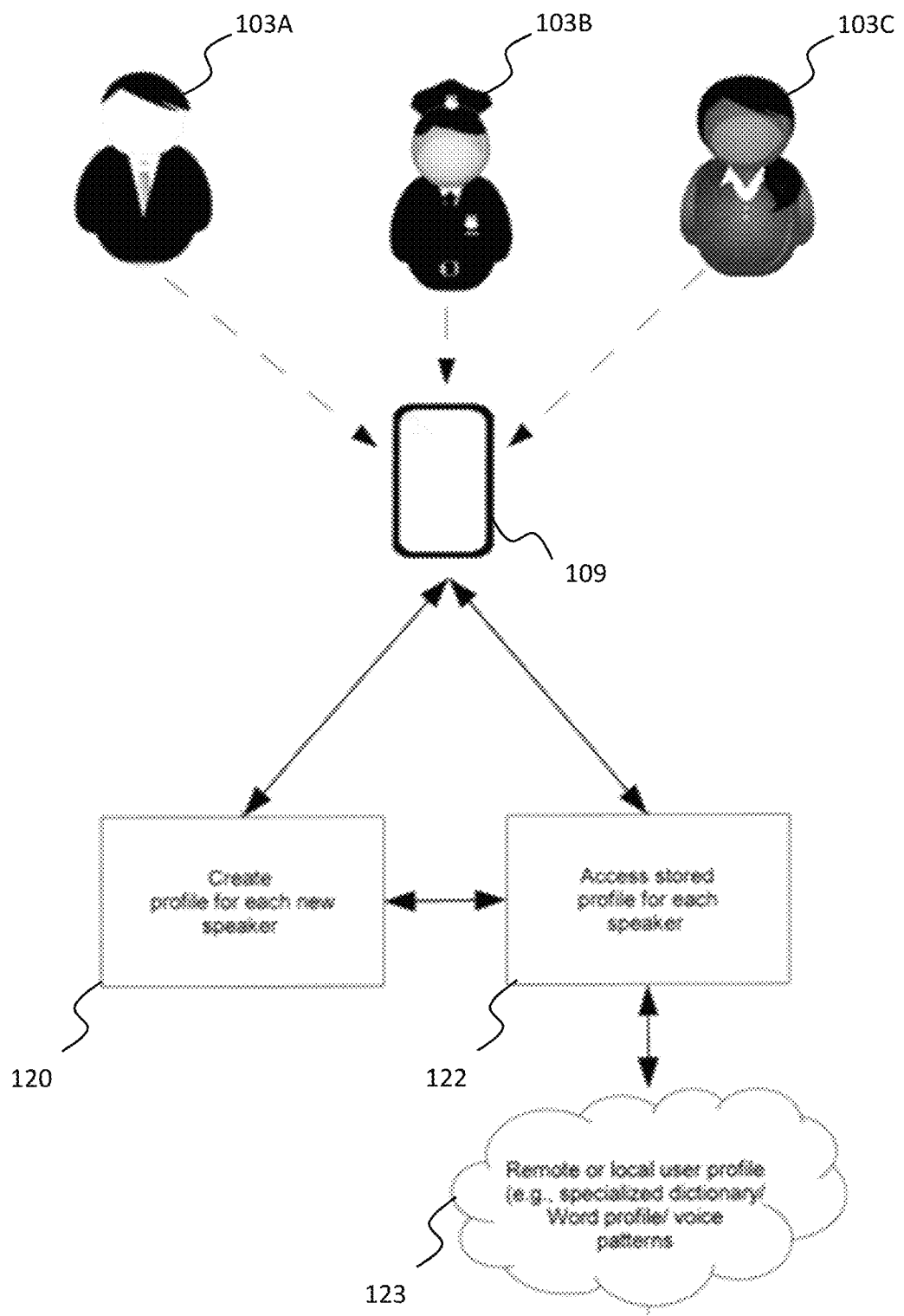

FIGS. 3A to 3C are conceptual diagrams that depict a plurality of deposition participants, in this instance a policeman 103B, and two attorneys 103A, 103C, their speech events being detected by a microphone incorporated into one of a computer or smart phone, in one embodiment, or in an alternative embodiment, by wired or wireless listening devices (microphones, not depicted here) which are themselves in communication with a smart phone or computer in accordance with some embodiments of the invention.

As shown in FIG. 3A, the speech of each of deponents 103A-103C is captured by a microphone 105 associated with a user interface 109 (e.g., a computing device such as a laptop, smartphone, tablet computer). According to such an embodiment, speaker identification module 232 identifies based on speech characteristics an identity of respective speakers in the recorded audio.

FIG. 3B depicts an alternative embodiment, where each deposition participant is associated with specific microphone 105A-105C. According to this example, each of microphones 105A-105C is coupled to a computing device (e.g., user interface 109), which are in turn coupled to a network 115 such as the internet. According to the example of FIG. 3B, where each deposition participant 103A-103C is associated with a particular microphone 105A-105C, speaker identification module 232 may identify a speaker in recorded audio based on which microphone recorded a particular audio segment. Alternatively, the speaker identification module 232 may identify a speaker based on one of the other voice recognition means discussed above.

FIG. 3C depicts one example where system 200 captures speech of deposition participants via a microphone 105 of a user interface device 109 (smartphone). As shown in FIG. 3C system 200, for each participant 103A-103C, system accesses one or more stored profiles 122 to associate recorded audio with a particular participant 103A-103C. If system 200 does not already have access to a stored profile, system 200 may create a profile for each new speaker 120, for example by requesting that the new user(s) read or repeat one or more phrases and analyzing the spoken phrases to create a user profile 122. In some embodiments a new user may not read or repeat a phrase, but a user profile will be generated dynamically during the course of the deposition. In some examples, user profiles may be stored locally (e.g., on user interface device 109), or remotely via a server computer coupled to system 200 via a network such as the internet.

The audio translation engine 207 may be remote, and audio data may be stored locally or remotely, including in a cloud based environment. The audio data may be stored in a location proximate to or remote from the audio translation engine, and the transcripts derived therefrom may also be stored locally or remotely from the audio translation engine and/or the audio-enabled devices. In one embodiment, the deposition data, including voice data, may be stored directly on an iPhone or other smart phone or computing device, which may or may not be configured as an audio translation engine 207 and/or a differentiation and association engine, and/or a server, in one embodiment. In another embodiment, where the smart phone or computing devise is not so configured, one or more of these functions may be remotely performed on speech data recorded and/or transmitted during a deposition, or recorded during and transmitted after a deposition.

In one embodiment, audio translation engine 207 (e.g., speech to text module 234, and in some embodiments in conjunction with 234) uses voice recognition technology to identify words and create a transcript based on recorded audio file(s). Audio translation engine 207 detects the voice profile of a specific speaker that is either stored locally or which can be accessed from a remote database utilizing network means, and identifies the speech acts of that specific individual as distinct from any other speakers. In another embodiment, where the system 200 is not equipped to identify a specific speaker by a stored or otherwise known audio profile, the identity of that speaker can be identified to the system 200 by generating a new profile such that speech from that individual is thereafter associated with that individual.

In some examples, audio translation engine 207 (e.g., speaker identification module 232) parses individual voices from a recording containing the speech of multiple individuals, and individuals may be identified through a variety of means, including by data from a user-specific voice profile, which may include data that can help identify the speech acts of one speaker from the sometimes contemporaneous speech acts of other speakers.

Audio translation engine 207 (e.g., speaker identification module 232) may identify a participant speaker based on one or a plurality of factors, including voice pitch height, pitch modulation, pitch range, speech rate, fluency, vocabulary, grammar, usage and other speech patterns. Additionally, audio translation engine 207 may identify a user by other vocal traits, including measurements of the speakers use of vowels, including (for example) average and standard deviation for fundamental frequency; period to period frequency; period to period amplitude variation; and GNE (glottal to noise excitation ratio), as examples. Other examples include pronunciation of known words, accent, intonation, speech speed, and user-specific word emphasis, or other physical, behavioral voice traits. Audio translation engine 207 (e.g., speaker identification module 232) may also identify a specific speaker by that speaker being pre-identified manually by anyone authorized to access 109.

Any other vocal or sound characteristic for a speaker may be utilized by transcript generation engine 207 (e.g., speaker identification module 232) without deviating from the scope of the invention. In one embodiment, and as an example, a plurality of speakers are identified as participating in a deposition or a court hearing. For each such speaker, one or more outlying speech traits are identified for those individuals, and in some preferred embodiments, the speech traits are identified based on how meaningfully they differentiate that speaker from the other speakers in the room.

As one example, high pitched voices can be meaningfully and reliably differentiated from a lower pitched voice. And, in addition to mere speech acts being identified as speech acts (sounds being identified as words as opposed to sounds being identified as sounds (e.g. paper moving, chairs shifting, ambient noise, etc.), the words so identified may be further identified as being uttered by a particular individual (in preferred embodiments as a known individual).

In one embodiment, one or more users in advance of a deposition (for example) will utilize system 200 (e.g., speaker identification module 232) to identify themselves by name, and may associate themselves with a known voice profile (locally or remotely stored; accessible in real time or accessible post-deposition). In another embodiment, system 200 (e.g., speaker identification module 232) may utilize microphone(s) 105 themselves to identify a speaker participant among participants of the deposition.

For example, system 200 (e.g., speaker identification module 232) may associate one microphone device 105 with each deposition participant, and identify disparate speakers based on which microphone 105 device recorded the audio. For example, a specific audio input may be associated with one distinct individual or with a discrete set of individuals. In such an embodiment, a speaker may wear a microphone 105 that clips on to clothing (e.g., a shirt collar), or a body part (e.g., an ear piece), and the system 200 is configured to identify the speech events detected by that microphone as being the speech events of the speaker wearing the microphone, as distinct from the speech events of other speakers, who themselves may be wearing similar, user-specific microphones (as recognized by the system). In still other examples, system 200 may associate microphones 105 that are not necessarily worn by participants, for example table-top or other microphones arranged in proximity to each respective speaker may be used to differentiate between the speech of respective deposition participants.

In some cases a voice profile and the resulting translation will enjoy exceptional accuracy due to repeat use of system 200, and the ongoing capture and analysis of individual-specific and matter-specific (e.g., case specific) data. Repeat use of the system enables the audio translation engine 207 to draw upon a larger body of data (of the kind identified above), which in turn will yield more accurate transcripts. In addition, audio translation engine 207 may enable post-deposition correction(s) via 109A-B of deposition transcripts that have been, for example, incorrectly translated or incompletely (for any reason) or where a portion of the transcript has been pre-flagged by 207 as being of questionable accuracy, for example due to the use of rare or hard to translate words. In another embodiment, audio translation engine 207 may ask a user, in advance of a legal proceeding, to read a standardized transcript that will be utilized by the translation engine 207 to differentiate that speaker from other speakers, by gathering voice data that assists in assigning speech acts to specific speakers in a room (e.g., voice pitch height and modulation, pitch range, speech rate, fluency, vocabulary, grammar, usage and other speech patterns).

In some instances, system 200 may incorporate, or access via networked means, data obtained from discovery and in preferred embodiment, one or more indexed discovery databases associated with the case at issue in the deposition. Such databases, including indexed discovery databases, typically include documents and data regarding those documents (e.g., metadata) that are produced by parties during the course of a proceeding. For example, witnesses in a case or other individuals in possession of discoverable information relevant to a case often produce relevant documents and things in a variety of forms, including: paper discovery, including notebooks, notepads, sketches, and the like and electronic discovery (i.e., eDiscovery, including information downloaded from servers, including email servers, backup tapes, local hard drives or flash drives). Electronically stored discovery may include documents that exist in many different file forms, including files utilized by word processing programs (e.g., doc, docx, dot files), excel files (xls, xlsx), pdf files, tif image files, text files (txt), and photo image files (jpe, jpg, jpeg, etc) among many others. In some instances, these files are gathered from document custodians and stored, and transformed/processed or analyzed using a variety of methods. Image files and pdf files, for example, may undergo optical character recognition (OCR) processing to determine whether they contain text, and convert the text to an ASCII format. Metadata associated with any file may be stored in order to identify later who wrote the document and when, a when it was edited and to whom it was sent (as examples). Physically produced "hard" documents may be scanned to transform it into an electronic format which can then undergo further processing (e.g., OCR processing).

Once the documents and data are converted into a usable and searchable file format, if it was not already in such a format, then the collective data may then be indexed, such that a document reviewer may then efficiently search substantially all documents produced, processed and stored by a party in order to locate information and facts relevant to a litigation case, without an attorney having to physically read the documents. In a case involving asbestos, for example, the indexed documents may be searched for key words or the names of key individuals, such that the documents may be readily identified.

In the context of the instant disclosure, system 200 may be linked by networked means to a discovery database for a particular case, and the data there obtained utilized by system 200, among other things, increase the accuracy of speech to text translation by STT module 234. By way of example, system 200 may be utilized to facilitate the deposition of a witness, Mr. Okerlund. System 200 may then query the discovery database of documents as a whole to identify the use of infrequently used terms, or in preferred embodiments documents specifically associated with Mr. Okerlund (e.g. associated utilizing metadata identifying emails and documents authored by Mr. Okerlund), and those documents may be analyzed by the system to identify language patterns particular to Mr. Okerlund, or the use of unusual or infrequently used words that have been used by Mr. Okerlund. STT module 234 may identify such words (in advance, during or after a deposition) as potential candidate terms for words spoken by Mr. Okerlund during his deposition that may be challenging to translate. More broadly speaking, system 200 may query the database as a whole to identify terms not typically present in everyday speech (and therefore more difficult to translate), but which may be used more frequently in a specific industry (e.g., complex pharmaceutical terms used in the context of a pharma patent dispute, for example).

Examples include difficult words, terms, names, places, chemical names, or other problematic terms that may come up in association with a case. Where, for example, a document repository contains references to uniquely-named places (e.g., Punxsutawney, Pennsylvania) or difficult biological, technical, scientific or chemical terms, (e.g., polysaccharides, immunoglobulin, dodecahedrane and the like) or any term (local idiom, for example) not commonly used in everyday speech, system 200 may proactively flag such terms from the indexed document production database. Audio translation engine 207 (e.g., speech to text module 234) may subsequently utilize these terms to increase the accuracy of the translation. In the same vein, system 200 may similarly index the word content of depositions associated with a case, such that uncommon or difficult words that have come up in the first (or earlier) deposition in a matter may be utilized to increase the accuracy of translations used in subsequent depositions.

In another embodiment, system 200 may produce a transcript of a deposition that contains links from words in the deposition transcript to actual documents in an indexed discovery database where those same words occur. The system 200 may be utilized to produce a complete deposition transcript of Mr. Okerlund that is more accurate and usefully cross-referenced to an indexed database of discovery documents. In one embodiment, the transcript will be more accurate where Mr. Okerlund references the city of Punxsutawney (correctly identified by the system 200 as "Punxsutawney" in the converted transcript as opposed to "punks and tawny" due to the fact that the term "Punxsutawney" was among those identified in the indexed discovery database as being an uncommonly used term occurring multiple times in associated documents (e.g., via metadata) with Mr. Okerlund). Moreover, utilizing user interface 109, a user may click the mouse on uncommon terms in the electronic transcript (or terms identified by a user of the system 200), and the system will query or otherwise access the indexed discovery database to identify documents where that same word or phrase occurred, Thus, a user of the system may access Mr. Okerlund's deposition transcript, clink on the term "Punxsutawney" and system 200 may identify specific documents in the discovery database where this term occurred, and in preferred embodiments may call out in particular those documents specifically associated with Mr. Okerlund (e.g., Mr. Okerlund's emails, identified via metadata) where that term occurred. Where system 200 has active access to such an indexed discovery database during the course of a deposition, system may dynamically search for documents in the discovery database by key word, and in such a way additional documents may be identified for use by an attorney utilizing system 200 during a deposition.

As described above, audio translation engine 207 may receive an indication to start a deposition proceeding from a user, and perform an initialization procedure. In one embodiment, a user may initiate the system 200 by launching an application on a smart phone or computer, which may, in preferred embodiments, prompt a participant (often an attorney) to input (or select an existing) case or case caption, participant contact information, email addresses, etc. Audio translation engine 207 may prompt each participant (deponent and attorneys) to introduce themselves or identify themselves (if they've used the system before and have an existing profile). Audio translation engine 207 will then, utilizing any means (voice, microphone assigned and proximate to or attached to a speaker, etc.) identify each individual so that it can property identify individuals and assign speech text to that individual, as opposed to other speakers.

Audio translation engine 207 may then prompt the participants to administer an oath or otherwise prompt an individual to electronically or verbally attest (using, for example, an e-signature or, by giving verbal assent) to a pre-drafted oath. In some embodiments, the system is configured to recite an oath using audio output device such as a speaker device, and the deponent is prompted to provide their verbal assent, which, along with the oath, is recorded and reflected in the transcript. Signatures may be given using a touch sensitive screen of a user interface 109, in one embodiment.

As the participants (e.g., attorneys and deponent) speak, the system 200, utilizing the apparatus and methods above, will detect speech acts of each speaker, record and translate them, and convert them into text. In a preferred embodiment, this may happen in real time, and can be corrected by a speaker in real time. For example, audio translation engine 207 (e.g., speech to text module 234) may translate speech captured by microphone(s) 105 in real time into text identified by user. Such real-time translated text may be displayed to the respective users via user interfaces 109. While the deposition is still proceeding, system 200 may provide users with the option to edit text to reflect what was said by a user, in the instance of errors.

In instances where multiple individuals speak at the same time, the system 200 may alert the parties and caution them about talking over one another. In some embodiments, however, it will be possible for the system 200 to parse out the disparate, contemporaneous speakers, and produce a transcript in any manner indicating that two speech acts were occurring at the same time or indicating there was overlap.

In one embodiment, and in embodiments where, for example, each speaker has their own microphone 105 (said microphone which may or may not be associated by the system with a known or discrete speaker) the system 200 will contemporaneously timestamp or otherwise mark all incoming audio data from multiple audio sources, such that audio data obtained from one microphone and associated with one known speaker will be marked with a time stamp (or functional equivalent) at the same time that audio data from other microphones, which are associated with other speakers, are also timestamped. When the system 200 is fed data streams from multiple data sources (i.e., from different microphones), the system may identify what data was being generated at 3:15:03 PM from microphone 1 and ascertain and synchronize with what data (audio data) was being generated at 3:15:03 PM from microphones 2 and 3 and 4 (or others). The system 200 may then utilize those time stamps in order properly order the speech events, in any manner desired, in a system-generated transcript.

In an alternative embodiment, system 200 may synchronize multiple data sources by analyzing not a common time stamp (or equivalent) but by synchronizing disparate data files by identifying across them an audio input that is substantially similar across the files. For example, in the case of multiple audio files, with different time stamps or lengths or start and end times, where the system 200 is able to identify a sound (a door closing, a horn), or a noise with a unique or semi-unique data profile, and that sound occurs across multiple data files, the system 200 will be able to identify that point in both (or across several) recordings (or files), and then work backward and/or forwards to synchronize the remainder of the files, thus "zippering" those disparate files, and the speech events that occurred on them, together. Other methods of synchronizing multiple audio files may also be utilized without departing from the scope of this disclosure.

Regardless of how it is accomplished (all audio from a deposition, in one embodiment) whether by being captured in a single file, or by capturing and synchronizing multiple files, acquired across multiple audio detection devices (e.g., microphones), once these files are obtained, the system 200 may utilize them to create a transcript that accurately captures and orders speech event into a transcript, which in preferred embodiments is rendered by attributing speech events to an identified speaker.

Once a deposition is complete, a participant (often an attorney) will utilize the system 200 to indicate that the deposition has concluded (e.g., via user interface 109). System 200 may forward a rough or complete transcript, or a notification that a transcript is available through a user interface, to all authorized parties requesting one (e.g., via email). Where all processing is handled contemporaneously with the deposition, and there is an acceptable error rate, a transcript may follow immediately upon conclusion of the deposition. In some instances, additional processing may be required, especially where words are difficult to translate (proper names of people or places, foreign words, highly technical terminology that isn't readily translated). System 200 may present, via user interface 109, a list of terms to each speaker to clarify which term was intended. To ensure that no inappropriate or inaccurate post-deposition changes are made to the transcript, in some embodiments, system 200 preserves an audio recording of the deposition and a time stamp applied to both the audio recording and a time stamp to the translation, so there is no doubt of what was said if there is a difference of opinion among the participants.

In another embodiment, where the system is unable to identify a word from a data file (due to ambient noise, a plane flying overhead, etc.), or where the identification is tentative (below a pre-set confidence threshold for the translation), then the system 200 may automatically and proactively forward that data file or a portion of that data file to the speaker or to any other individual associated with that speech act, and that individual may listen to the original audio file and identify what it was they said. In another embodiment, where the original speaker is not available (or where otherwise desired) a human non-speaker translator may listen to the audio file and identify the words used. In some embodiments, system may pull out of a larger audio file a smaller audio file or a series of snippets from a deposition and forwarded in compressed or uncompressed and encrypted or unencrypted format to a translator, who can eliminate errors and verify the accuracy of the translation. In some embodiments, overseas translators may be utilized.

In one embodiment, system 200 gives the participants themselves an amount of time to read and sign the transcript. Once signed, system 200 sends initialized transcripts to each of the parties and stored locally or in a cloud environment.

In one embodiment, the system 200 uses finished transcripts to increase accuracy of future depositions, especially where participants use the system in another deposition involving the same matter, wherein the same specialized language is utilized.

Figure 4:
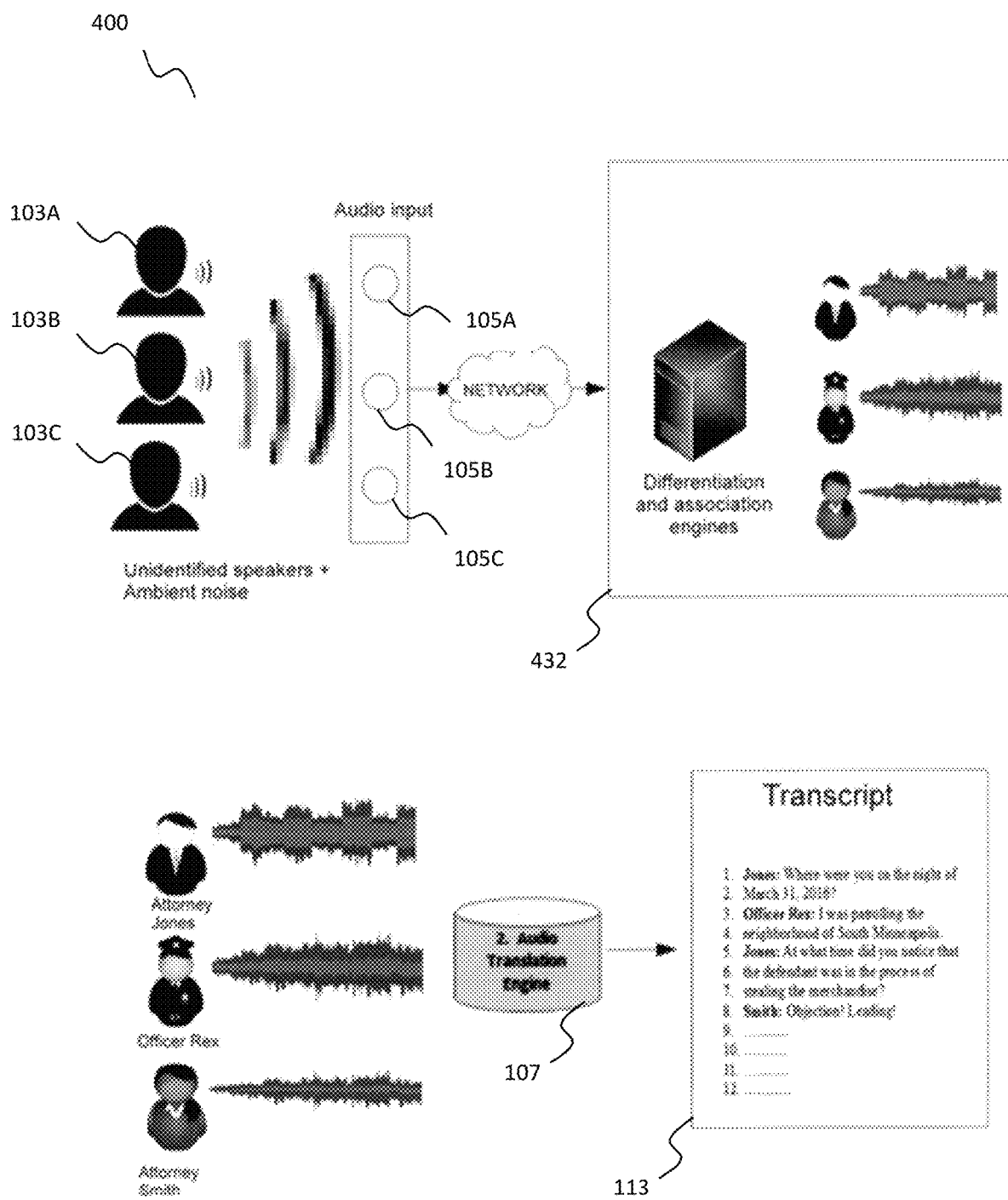
FIG. 4 is a conceptual diagram depicting one example of recording of speech from deposition participants to generate a transcript consistent with one or more aspects of this disclosure.

FIG. 4 is a conceptual diagram illustrating one example of an Automated Legal Proceeding Assistant (ALPA) system 400 consistent with one or more aspects of this disclosure. As shown in FIG. 4, system 400 is arranged to assist with a deposition with three participants 103A-103C. According to this example, each deponent is associated with a respective microphone 105A-105C. As shown in FIG. 4, digital data representing recorded audio from the deposition proceeding is communicated over a network such as the internet to a speaker identification module 432. The speaker identification module 432 comprises software instructions stored in a tangible medium executable by a processor of a computing device, such as user interface(s) local to the deposition proceeding, or one or more remote server computing devices located remotely from the deposition proceeding and connected via a network such as the internet. As shown in FIG. 4, speaker identification module 432 includes a differentiation and association engine that maps recorded audio to one or more profiles associated with participants to the deposition. In this manner, the speaker identification module 432 assigns an identity to words and phrases included in the audio recording.

The assignment of an identity to recorded speech may be used, as also shown in FIG. 4, by audio translation engine 207 to generate a transcript 113 which reflects what was said by whom in the deposition.

Figure 5:
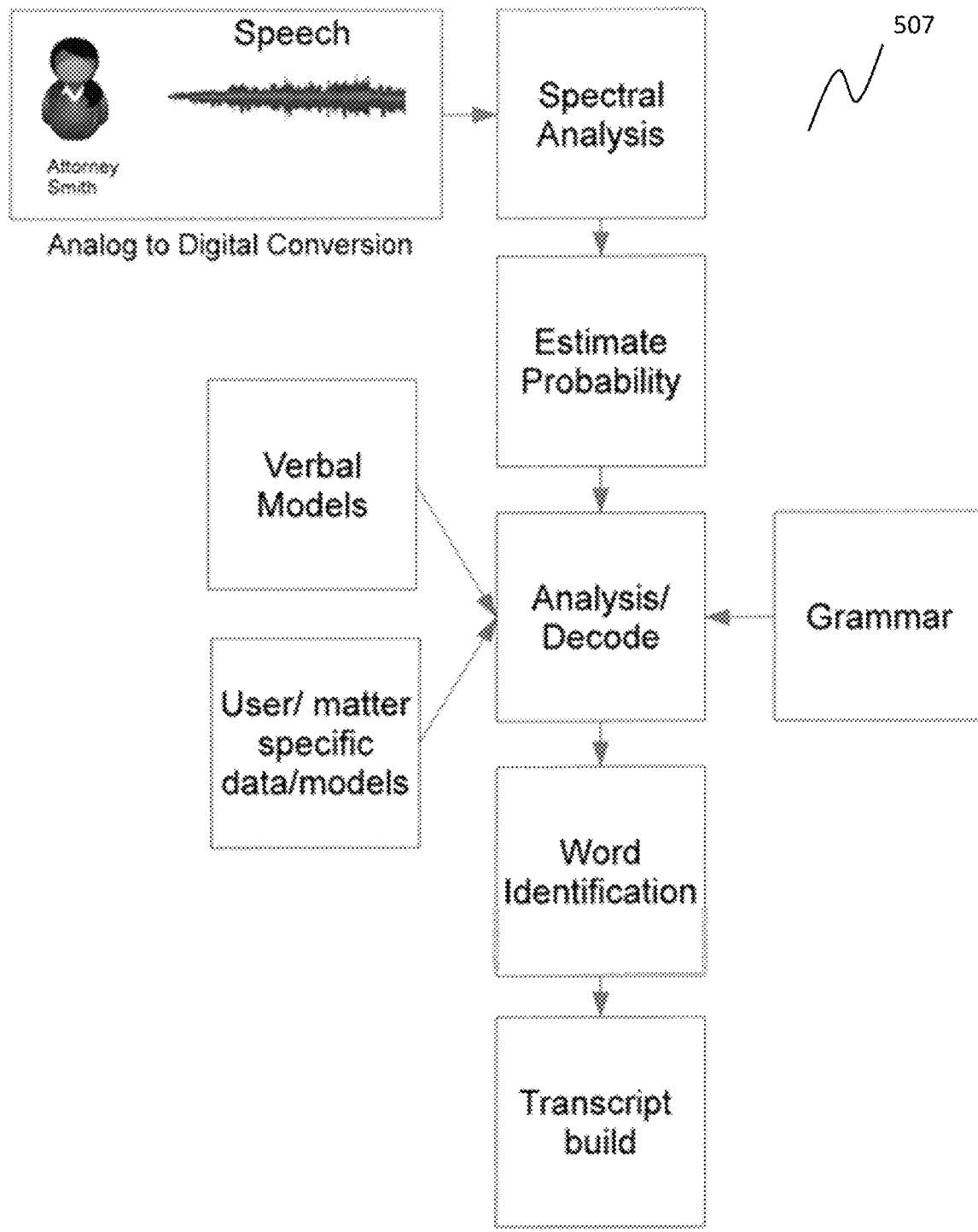
FIG. 5 is a conceptual diagram depicting one example of audio processing to generate a transcript consistent with one or more aspects of this disclosure.

FIG. 5 is a block diagram illustrating one example of an audio translation engine 207 consistent with one or more aspects of this disclosure. As depicted in FIG. 5, audio translation engine 507 is configured to receive a digital representation of an audio recording that includes speech captured by microphone(s) 105 as part of a deposition proceeding. As shown in FIG. 5, audio translation engine 207 performs a spectral analysis on the audio recording. As also shown in FIG. 5, audio translation engine 507 estimates a probability that the performed spectral analysis is correct. As also shown in FIG. 5, audio translation engine 507 performs analysis on the audio data, to compare it to verbal models, user specific profiles, and grammar models. As also shown in FIG. 5, based on the comparison, audio translation engine 507 identifies words in the audio data. As also shown, audio translation engine 107 builds a transcript based on the identified words. This is but one example of the class of audio translation engines that may be employed. Any system known in the art or hereinafter developed may be employed without departing from the scope of the invention.

Figure 6:
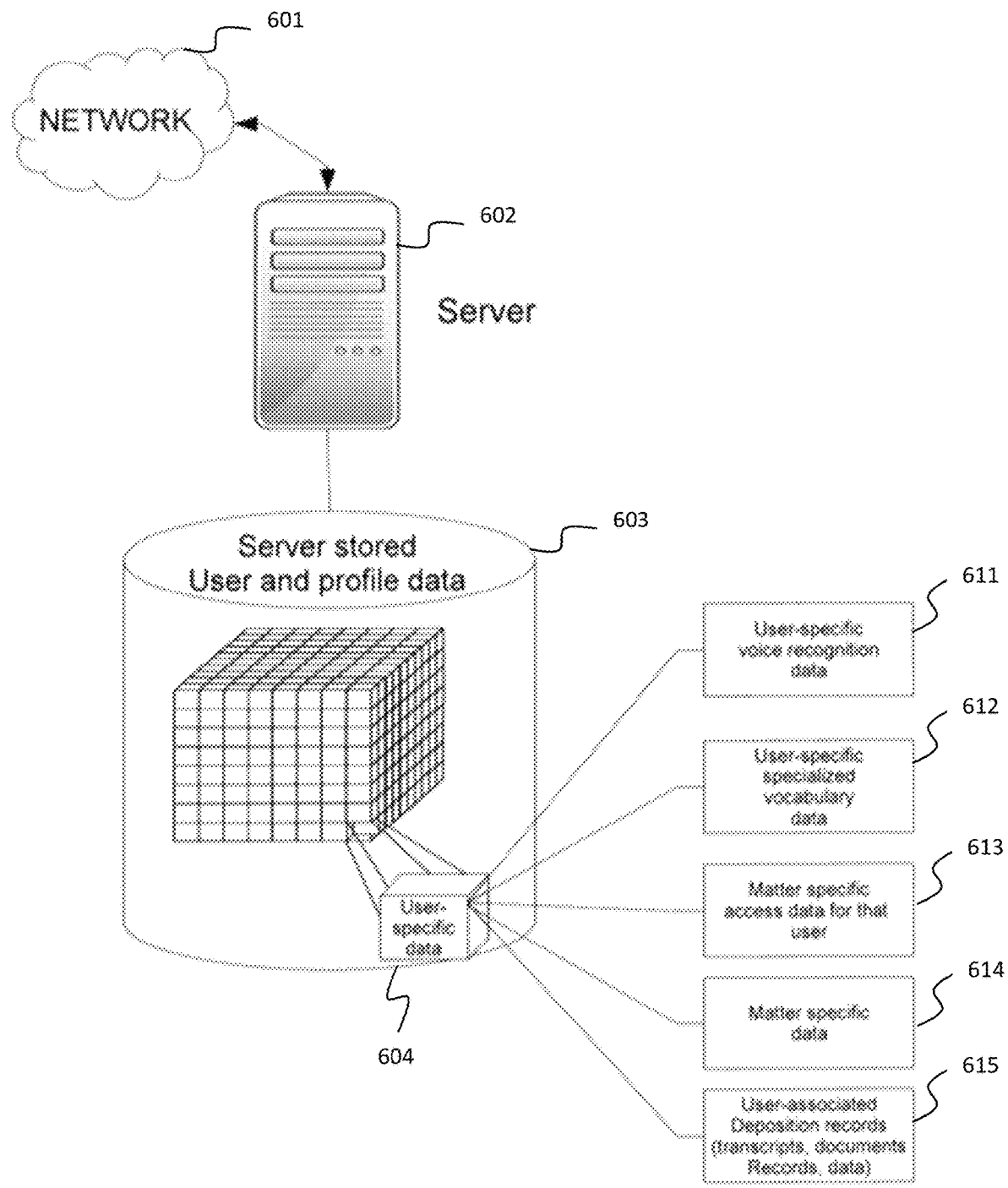
FIG. 6 is a conceptual diagram depicting one example of data that may be stored by a server consistent with one or more aspects of this disclosure.

FIG. 6 is a conceptual diagram that illustrates one example of data that may be stored at a server computing device of an ALPA system 200 consistent with one or more aspects of this disclosure. As shown in FIG. 6, server 602 is coupled to a network 601, such as the internet. As shown in FIG. 6, server 602 is coupled to or contains one or more storage devices 603, for example temporary memory such as random-access memory, or long-term storage such as a magnetic hard disc, flash memory, or the like.

Server 602 is configured to store user-specific data 604. As shown in FIG. 6, the user-specific data 604 may include user-specific voice recognition data 611, user-specific specialized vocabulary data 612, matter specific access data for a user 613, matter specific data 614, and user-associated deposition records 615. User-specific voice recognition data 611 may include one or more user speech profiles including speech parameters and characteristics that speaker identification module 232 uses to identify a speaker associated with a recorded audio segment. User specialized vocabulary data 612 may include data indicating specific vocabulary used by a particular deposition participant user, which may be used by speaker identification module 232, speech to text module 234, or both. Matter specific data 614 may include data specific to a particular court or law firm matter associated with a particular deposition or plurality of deposition proceedings. By way of example, said matter specific data may include data obtained from discovery documents associated with a specific matter (i.e., a specific litigation case), such as unusual terminology or names that occur in produced documents). User-associated deposition records 615 may include information associated with a particular user, which may include information from multiple deposition proceedings across multiple cases or matters that involved a particular user.

Figure 7:
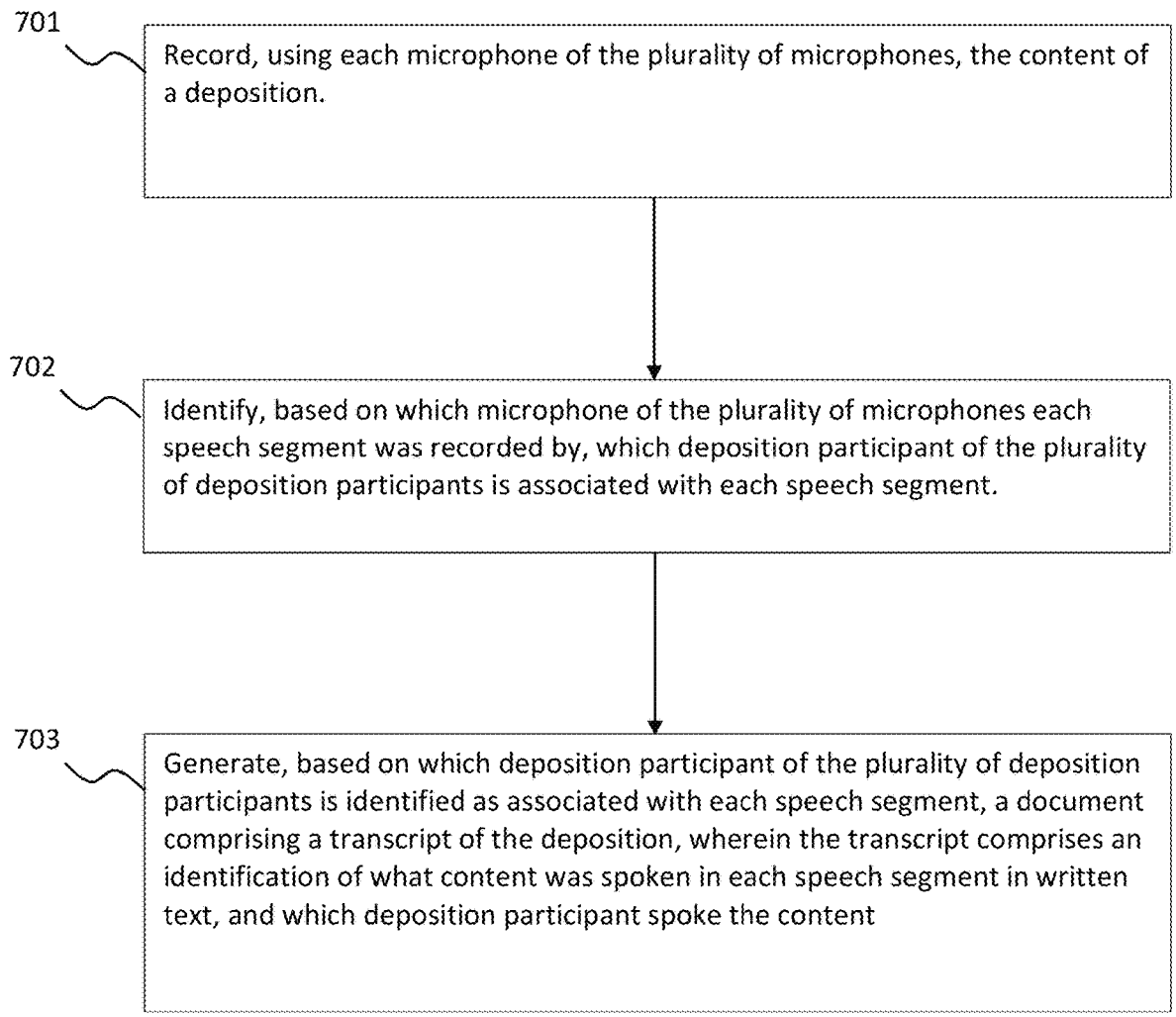
FIG. 7 is a flow diagram depicting one example of a method of automatically generating a legal proceeding transcript consistent with one or more aspects of this disclosure.

FIG. 7 is a flow diagram illustrating one example of a method of automatically generating a legal proceeding transcript according to one or more aspects of this disclosure. At 701, the method includes recording, using a plurality of microphones each associated with a deposition participant of a plurality of deposition participants, the content of a deposition. The content of the deposition includes a plurality of speech segments recorded by the plurality of microphones. At 702, the method includes identifying, based on which microphone of the plurality of microphones each speech segment was recorded by, which deposition participant of the plurality of deposition participants is associated with each speech segment. In other examples not depicted in FIG. 7, the method may include identifying which deposition of the plurality of deposition participants is associated with each speech segment based on processing the recorded audio segments to compare speech properties to a predetermined profile representing the respective deposition participants. The method may further includes converting the speech content of each recorded speech segment into written text. At 703, the method includes generating, based on which deposition participant of the plurality of deposition participants is identified as associated with each speech segment, a document comprising a transcript of the deposition, wherein the transcript comprises written text identifying sequentially what content was spoken and which deposition participant of the plurality of deposition participants spoke the content.

Figure 8:
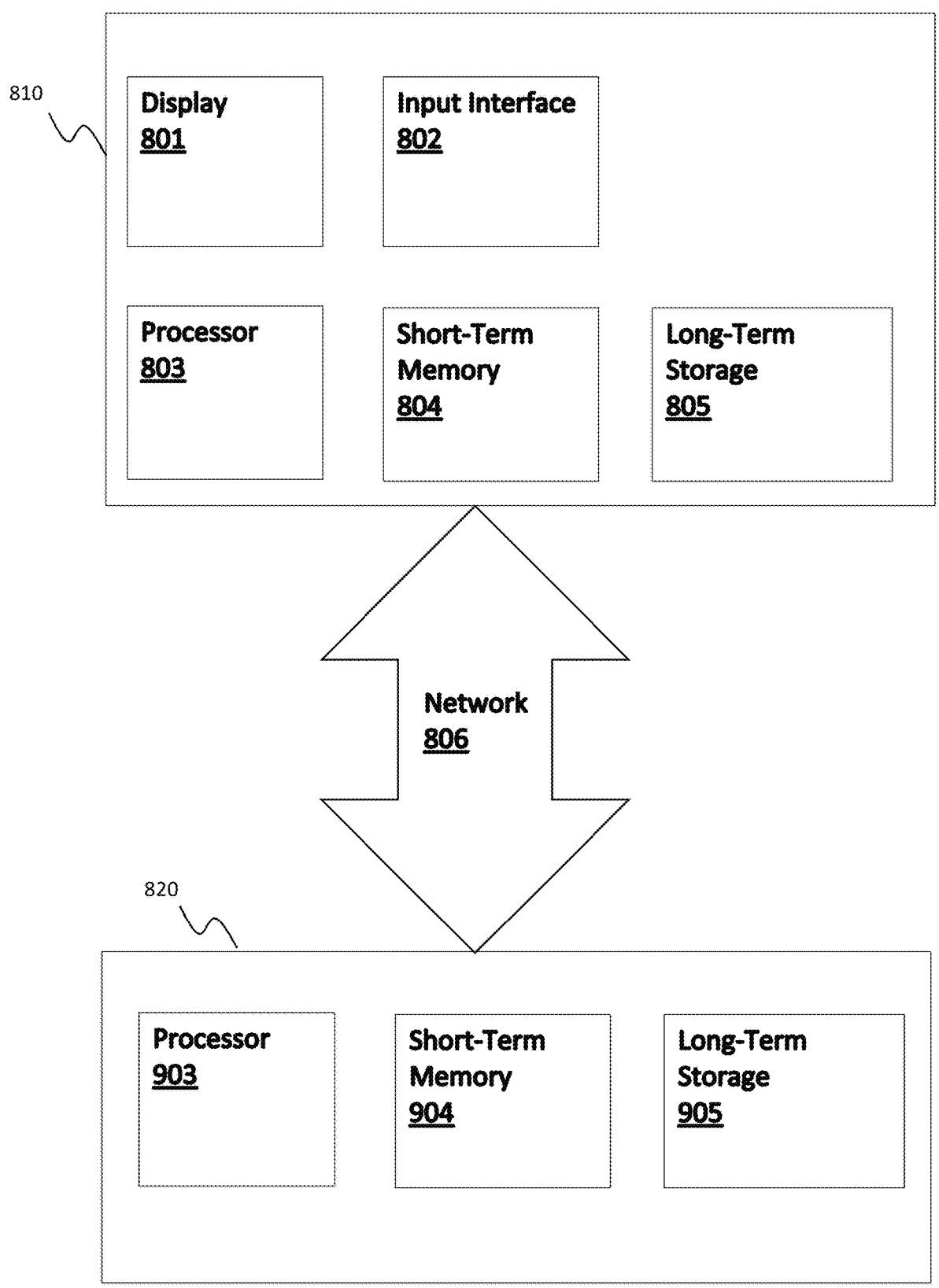
FIG. 8 is a block diagram illustrating a computing environment in which respective components of an automated legal proceeding assistant system may operate consistent with one or more aspects of this disclosure.

FIG. 8 is a block diagram depicting generally a computing environment in which the ALPA system 200 described herein may operate. As shown in FIG. 8, the computing environment includes both a local computing device 810 and a network computing device 820. Local computing device 810 is a device located close to a legal proceeding such as a deposition, and may comprise a desktop, laptop, smartphone, or tablet computing device. Local computing device 810 may serve as a user interface 209, which allows one or more users of ALPA system 200 to interact with system 200, for example to receive messages, or to input instructions or information, either before or during or after a deposition. For example, as shown in FIG. 8, local computing device includes a display 801 and an input interface 802. In the case where local computing device 810 comprises a laptop or desktop computer, input interface 802 may be a keyboard, mouse, trackpad, or the like. In cases where local computing device 810 is a smartphone or tablet computing device, input interface 802 may include a touchscreen display of the device configured to receive user input via touch.

As also shown in FIG. 8, local computing device 810 includes a processor 803, short-term memory 804, and long term storage 805. Processor 803 comprises any computing device, such as a central processing unit (CPU), graphics processing unit (GPU), Application Specific Integrated Circuit (ASIC), field programmable gate array (FPGA) or the like capable of executing instructions to cause local computing device 820 to operate in an intended manner. Long term storage 805 may comprise a tangible computer-readable medium configured to store data and program instructions capable of execution by processor 803. For example, long-term storage 805 may include one or more tangible media, such as a magnetic hard drive or flash memory hard drive. Short term storage 804, which is also considered tangible media, is configured to temporarily store instructions and/or data for execution by processor 803.

In operation, program instructions stored in long-term storage 805 may be loaded into short term memory 804, and executed via processor 803.

As shown in FIG. 8, the computing environment further includes remote computing device 820, which like local computing device 810, includes a processor 903, short term memory 904, and long-term memory 905. Each of these components operates similarly to their counterparts in local computing device 810, with long term storage 905 storing program instructions and/or data, which may be loaded onto short-term storage 904 for execution by processor 903. Remote computing device 820 may be communicatively coupled to local computing device 810 via a network, such as the internet.

One of skill in the art will readily understand that any portion of the ALPA system 200 described herein may comprise program instructions executable by a processor of either local computing device 810 (processor 803) or remote computing device 820 (processor 903). For example, any components of audio processing engine 207, including audio storage module 230, speaker identification module 232, speech-to-text module 234, and transcript generator 240 may comprise program instructions stored in respective tangible media (804, 904) and executed solely by local computing device 810 or remote computing device 820, or in combination between local computing device 810 and remote computing device 820 without departing from the scope of this disclosure. Furthermore, data used by system 200 to automatically generate legal proceeding transcripts may operate on data stored at local computing device 810, remote computing device 820, or both. For example, the various data depicted in FIG. 6, including user profiles enabling the identification of the source of recorded speech, may be stored in local computing device 810, remote computing device 820, or any combination of local computing device 810 and remote computing device 820.

As one specific example, during a deposition proceeding, each participant to the deposition proceeding may have access to a local computing device 810 (user interface 109) that includes instructions stored in short-term memory 804 or long-term memory 805 to cause a software application to execute on processor 803. The software application may serve as an interface for the respective deposition participants to interact with system 200. The software application may, for example, provide users with selectable prompts such as to initialize a deposition proceeding, to submit oaths, to assign microphones 105 to deposition participants, to commence a deposition proceeding, or to conclude the deposition proceeding.

According to this example, local computing device(s) 810 may be coupled to one or more microphone(s) 105, which may be either included in the respective local computing device(s) 810, or communicatively coupled to the respective local computing device(s). The software application may receive one or more digital representations of recorded audio data as one or more audio segments. The software application may send the recorded audio to data to remote computing device 820 via network 806. According to this example, audio storage module 230 may execute on processor 803 of local computing device 810 to prepare and send the audio data to remote computing device 820. For example, audio storage module 230 executing on local computing device 810 may encode audio data to reduce a transmission size of the audio data. As another example, audio storage module 230 executing on local computing device 810 may encrypt received audio data to improve a security of transmission of the audio data.

At least a portion of audio storage module 230 may include software instructions stored in a tangible medium (short-term memory 904, long-term storage 905) of remote computing device 820, and may be operable to receive transmitted audio data and store it (e.g., in short-term memory 904, long-term storage 905) for processing.

According to this example, speaker identification module 232 and speech-to-text module 234 may include executable program instructions stored in a tangible medium (short-term memory 904, long-term storage 905) and executable on a processor 903 of remote computing device 820 that cause remote computing device 820 to associate respective deposition participants with speech contained in the stored audio recordings, and speech-to-text module 234 may process the stored audio to convert recorded speech into representative text. According to this example, transcript generator 240 also includes program instructions stored in a tangible medium (short-term memory 904, long-term storage 905) and executable on a processor 903 of remote computing device 820 that cause remote computing device 820 to generate a document comprising a transcript that represents sequentially what was said during the deposition proceeding, and who said it.

In an example, once an initial transcript is generated, transcript generator 240 executing on remote device 820 sends the generated transcript document, or a message alerting them to its availability, to one or more deposition participants via network 806. For example, remote device 820 may send the generated transcript, or notice of its availability, to the respective participants through the previously described software application executing on local computing device 810. As previously described, the generated transcript may include identifications of one or more ambiguities in the transcript that could not be resolved with a high probability of accuracy. In some examples, the software application may give the deposition participants a time-window in which to respond to accept, reject, or provide feedback with respect to the generate transcript, including identified ambiguitie(s). In some examples, once all deposition participants have responded to either clarify all identified ambiguities or accept the initial transcript, the software application executing on local computing device 810 may send an indication to generate a final transcript to the remote computing device 820. Remote computing device 820 may generate the final transcript, including resolving identified ambiguities based on deposition participant feedback received through the software application, and generate a final deposition transcript. The final deposition transcript may be sent to the participants via network 806 through the software application executing on the local computing device 810.

What is claimed is:

1. A method comprising:
   linking an e-discovery database to an automated speech-to-text translation system;
   identifying at least one participant to a deposition;
   query the e-discovery database for documents associated with the at least one identified participant to the deposition to identify a subset of documents;
   analyze the subset of documents to identify words, phrases, and/or speech patterns associated with the at least one participant to the deposition;
   receiving a first plurality of audio files from a first microphone associated with a first participant to the deposition;
   receiving a second plurality of audio files from a second microphone associated with a second participant to the deposition, wherein the first microphone is remotely located relative to the second microphone;
   storing the first plurality of audio files and the second plurality of audio files in memory;
   generating a real-time transcript during the deposition by applying the speech-to-text translation system to the first and second plurality of audio files, wherein the association between the participants and the microphones is utilized to identify a speaker in the real-time transcript, and wherein the identified words, phrases, and/or speech patterns are utilized to resolve terms identified as ambiguous by the speech-to-text translation system; and
   displaying the real-time transcript via a user interface associated with at least one of the first participant or the second participant.

2. The method of claim 1, further including:
   displaying or highlighting within the real-time transcript the terms identified as ambiguous; and
   receiving feedback from either the first participant or the second participant confirming or rejecting the terms identified as ambiguous and resolved by reference to the e-discovery database; and
   incorporating the received feedback into the real-time transcript.

3. The method of claim 2, further including:
   providing one or more suggestions for selection by the first participant or the second participant to resolve the terms identified as ambiguous.

4. The method of claim 3, wherein the one or more suggestions are based on a query of the e-discovery database.

5. The method of claim 1, wherein generating the real-time transcript includes utilizing speech characteristics of the first participant and the second participant to identify the speaker in the real-time transcript.

6. The method of claim 1, further including:
   receiving feedback via the one or more displays to accept, reject and/or modify portions of the real-time transcript.

7. The method of claim 1, further including:
   receiving feedback from either the first participant or the second participant that includes a selection of one or more terms from the real-time transcript using the user interface associated with at least one of the first participant or the second participant;
   conducting a search of the e-discovery database based on the selected search terms; and
   displaying the search results via the user interface associated with at least one of the first participant or the second participant.

8. The method of claim 1, wherein each of the first plurality of audio files and the each of the second plurality of audio files includes timestamps synchronized to one another, wherein the timestamps associated with each of the plurality of audio files are utilized to correctly order the real-time transcript.

9. A method comprising:
   linking an e-discovery database to an automated speech-to-text translation system;
   identifying at least one participant to a deposition;
   query the e-discovery database for documents associated with the at least one identified participant to the deposition to identify a subset of documents;
   analyze the subset of documents to identify words, phrases, and/or speech patterns associated with the at least one participant to the deposition;
   receiving a first plurality of audio files from a first microphone associated with a first participant to a deposition;
   receiving a second plurality of audio files from a second microphone associated with a second participant to the deposition, wherein the first microphone is remotely located relative to the second microphone;
   storing the first plurality of audio files and the second plurality of audio files in memory;
   generating a real-time transcript during the deposition by applying a speech-to-text translation system on the first and second plurality of audio files, wherein timestamps associated with each of the plurality of audio files are utilized to correctly order the real-time transcript and wherein the association between the participants and the microphones is utilized to identify a speaker in the real-time transcript, wherein the speech-to-text translation system identifies terms that are ambiguous in the real-time transcript and utilizes the words, phrases, and/or speech patterns to resolve ambiguous terms;

displaying the real-time transcript via a user interface associated with at least one of the first participant or the second participant;

receiving feedback from either the first participant or the second participant that includes a selection of one or more terms from the real-time transcript using the user interface associated with at least one of the first participant or the second participant;

conducting a search of the e-discovery database based on the selected search terms; and displaying search results via the user interface associated with at least one of the first participant or the second participant.

10. The method of claim 9, wherein the speech-to-text translation system identifies terms that are ambiguous in the real-time transcript displayed to a user.

11. The method of claim 10, further including:

receiving feedback from either the first participant or the second participant regarding the ambiguous terms; and incorporating the received feedback into the real-time transcript.

* * * * *